(12) United States Patent
Venkatesan et al.

(10) Patent No.: US 11,493,615 B2
(45) Date of Patent: Nov. 8, 2022

(54) SYSTEMS AND METHODS FOR DETECTING AN ELECTROMAGNETIC SIGNAL IN A CONSTANT INTERFERENCE ENVIRONMENT

(71) Applicant: VELODYNE LIDAR USA, INC., San Jose, CA (US)

(72) Inventors: Pravin Kumar Venkatesan, Fremont, CA (US); Roger Jullian Pinto, Alameda, CA (US); Jianghui Su, San Jose, CA (US); Abhilash Goyal, Fremont, CA (US)

(73) Assignee: VELODYNE LIDAR USA, INC., San Jose, CA (US)

( * ) Notice: Subject to any disclaimer, the term of this patent is extended or adjusted under 35 U.S.C. 154(b) by 624 days.

(21) Appl. No.: 16/128,373

(22) Filed: Sep. 11, 2018

(65) Prior Publication Data

US 2020/0081104 A1 Mar. 12, 2020

(51) Int. Cl.
*G01S 7/487* (2006.01)
*G01S 17/10* (2020.01)
(52) U.S. Cl.
CPC .......... *G01S 7/4873* (2013.01); *G01S 7/4876* (2013.01); *G01S 17/10* (2013.01)
(58) Field of Classification Search
CPC ....... G01S 7/487; G01S 7/4873; G01S 7/4876
See application file for complete search history.

(56) References Cited

U.S. PATENT DOCUMENTS

| 6,392,747 | B1 * | 5/2002 | Allen | G01S 7/486 |
| | | | | 356/141.1 |
| 7,633,049 | B1 * | 12/2009 | Huang | G01V 8/10 |
| | | | | 250/221 |
| 10,656,251 | B1 * | 5/2020 | Mandai | G01J 1/0233 |
| 2002/0036765 | A1 * | 3/2002 | McCaffrey | G01S 17/894 |
| | | | | 356/5.08 |
| 2011/0148365 | A1 | 6/2011 | Doerr | |
| 2013/0050144 | A1 | 2/2013 | Reynolds | |

(Continued)

OTHER PUBLICATIONS

International Search Report and Written Opinion of PCT/US2019/046422 dated Dec. 3, 2019, 9 pages.

(Continued)

*Primary Examiner* — Eric L Bolda
(74) *Attorney, Agent, or Firm* — Goodwin Procter LLP

(57) ABSTRACT

Described herein are systems and methods that detect an electromagnetic signal in a constant interference environment. In one embodiment, the electromagnetic signal is a light signal. A constant interference detector may detect false signal "hits" generated by constant interference, such as bright light saturation, from valid signals. The constant interference detector determines if there is constant interference for a time period that is greater than a time period of the valid signal. In one embodiment, if a received signal exceeds a programmable threshold value for a programmable period of time, when compared to previously stored ambient light, a control signal is generated to inform the next higher network layer of a sudden change in ambient light. This control signal can be used to either discard the present return or process the signal in a different way. A constant interference detector may be a component of a LIDAR system.

16 Claims, 10 Drawing Sheets

Constant Interference Detector

(56) References Cited

U.S. PATENT DOCUMENTS

| | | | |
|---|---|---|---|
| 2013/0250275 A1* | 9/2013 | Liu | G01C 3/08 |
| | | | 356/5.01 |
| 2013/0336375 A1 | 12/2013 | Ranki et al. | |
| 2014/0274093 A1 | 9/2014 | Abdelmonem et al. | |
| 2016/0049058 A1 | 2/2016 | Allen et al. | |
| 2016/0265968 A1* | 9/2016 | Boutaud | G01S 17/04 |
| 2016/0300484 A1 | 10/2016 | Torbett | |
| 2016/0363659 A1 | 12/2016 | Mindell et al. | |
| 2018/0095167 A1 | 4/2018 | Shirasaka et al. | |
| 2018/0123611 A1 | 5/2018 | Dutton et al. | |
| 2018/0136321 A1* | 5/2018 | Verghese | G01S 7/4865 |
| 2018/0238998 A1 | 8/2018 | Dussan et al. | |
| 2019/0129009 A1* | 5/2019 | Eichenholz | H03K 17/0416 |
| 2020/0064451 A1* | 2/2020 | Matsui | H01L 31/107 |

OTHER PUBLICATIONS

Extended European Search Report, dated Sep. 24, 2021, in European Patent Application 19859605.8, filed Mar. 9, 2021 (10 pgs).
Russian Patent Office, Office Action, App. No. 2021109789 (dated Apr. 13, 2021), 6 pages.

* cited by examiner

For LiDAR the light source is a laser

DC Voltage2 is a programmable value that is less than the value of DC Voltage1, for example, 60%.

400

DC Detection Block and Associated Logic

SYSTEMS AND METHODS FOR DETECTING AN ELECTROMAGNETIC SIGNAL IN A CONSTANT INTERFERENCE ENVIRONMENT

BACKGROUND

A. Technical Field

The present disclosure relates generally to systems and methods for electromagnetic signal reception, and more particularly to improving the accuracy and reliability of detection of light signals in a constant interference environment.

B. Background

A receiver may be designed to receive periodic signals or pulses from an electromagnetic source. In this environment, detection of the periodic signals may be difficult if a constant interference signal co-exists with the periodic signals. For example, the reception of light pulses may be challenging in a bright sunlight environment.

In some embodiments, light detection and ranging systems, such as a LIDAR system, may operate by transmitting a series of light pulses that reflect off objects. The reflected signal, or return signal, is received by the light detection and ranging system. Based on the detected time-of-flight (TOF), the system determines the range (distance) the system is located from the object. Light detection and ranging systems may have a wide range of applications including autonomous driving and aerial mapping of a surface. These applications may place a high priority on the security, accuracy and reliability of the operation. If the LIDAR system is in a bright sunlight environment, the accuracy and reliability may be negatively impacted. A similar situation may exist for other naturally or artificially generated electromagnetic signals.

Accordingly, what is needed are systems and methods for improving detection of a return signal or pulse signal in a constant interference signal environment.

BRIEF DESCRIPTION OF THE DRAWINGS

References will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments. Items in the figures are not to scale.

Figure ("FIG.") 1 depicts the operation of a light detection and ranging system according to embodiments of the present document.

DETAILED DESCRIPTION OF EMBODIMENTS

Figure 1:
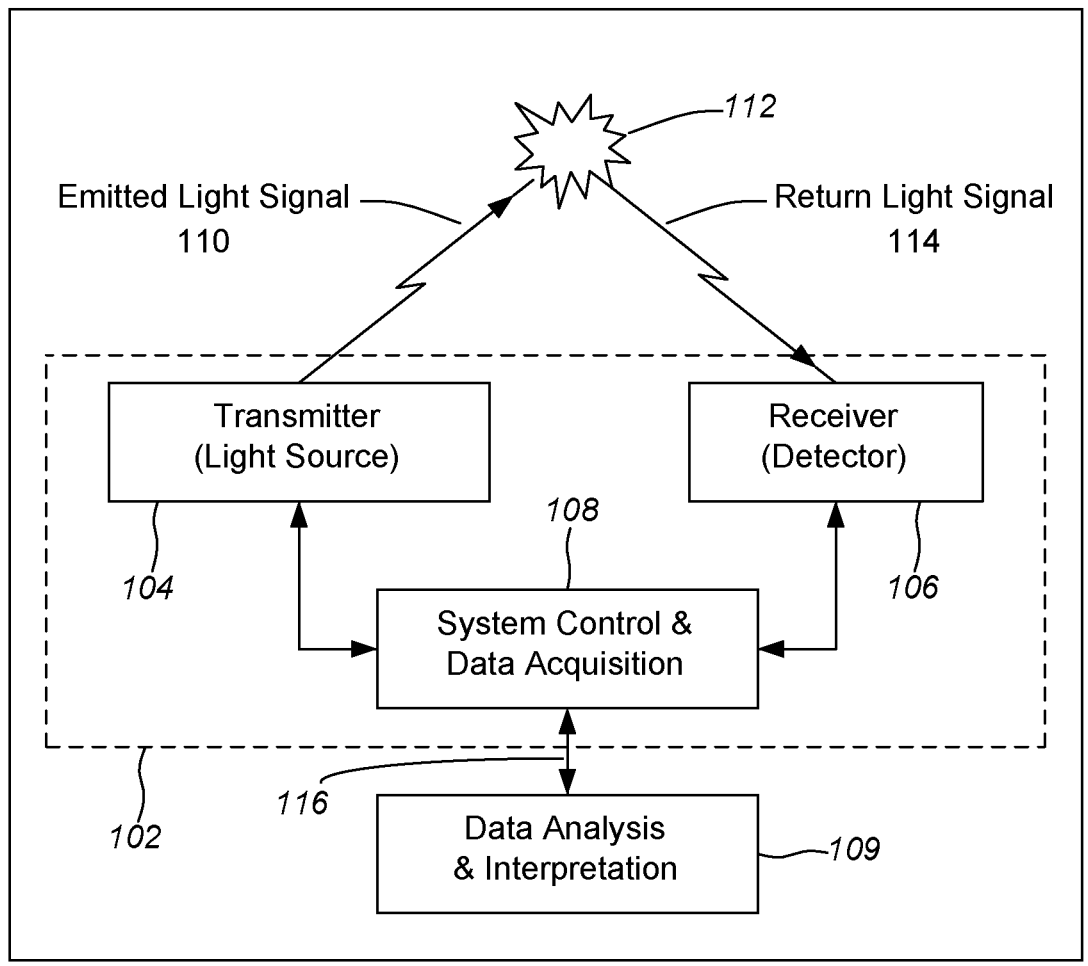

In the following description, for purposes of explanation, specific details are set forth in order to provide an understanding of the invention. It will be apparent, however, to one skilled in the art that the invention can be practiced without these details. Furthermore, one skilled in the art will recognize that embodiments of the present invention, described below, may be implemented in a variety of ways, such as a process, an apparatus, a system, a device, or a method on a tangible computer-readable medium.

Components, or modules, shown in diagrams are illustrative of exemplary embodiments of the invention and are meant to avoid obscuring the invention. It shall also be understood that throughout this discussion that components may be described as separate functional units, which may comprise sub-units, but those skilled in the art will recognize that various components, or portions thereof, may be divided into separate components or may be integrated together, including integrated within a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," or "communicatively coupled" shall be understood to include direct connections, indirect connections through one or more intermediary devices, and wireless connections.

Reference in the specification to "one embodiment," "preferred embodiment," "an embodiment," or "embodiments" means that a particular feature, structure, characteristic, or function described in connection with the embodiment is included in at least one embodiment of the invention and may be in more than one embodiment. Also, the appearances of the above-noted phrases in various places in the specification are not necessarily all referring to the same embodiment or embodiments.

The use of certain terms in various places in the specification is for illustration and should not be construed as limiting. A service, function, or resource is not limited to a single service, function, or resource; usage of these terms may refer to a grouping of related services, functions, or resources, which may be distributed or aggregated.

The terms "include," "including," "comprise," and "comprising" shall be understood to be open terms and any lists the follow are examples and not meant to be limited to the listed items. Any headings used herein are for organizational purposes only and shall not be used to limit the scope of the description or the claims. Each reference mentioned in this patent document is incorporate by reference herein in its entirety.

Furthermore, one skilled in the art shall recognize that: (1) certain steps may optionally be performed; (2) steps may not be limited to the specific order set forth herein; (3) certain steps may be performed in different orders; and (4) certain steps may be done concurrently.

A. Light Detection and Ranging System

As discussed herein, in some embodiments, a receiver is designed to receive periodic signals or pulses from an electromagnetic source. In such environments, detection of the periodic signals may be difficult if a constant interference signal co-exists with the periodic signals. For example, reception of light pulses may be challenging for a LIDAR system in a bright sunlight environment.

A light detection and ranging system, such as a LIDAR system, may be a tool to measure the shape and contour of the environment surrounding the system. LIDAR systems may be applied to numerous applications including both autonomous navigation and aerial mapping of a surface. LIDAR systems emit a light pulse that is subsequently reflected off an object within the environment in which a system operates. The time each pulse travels from being emitted to being received may be measured (i.e., time-of-flight "TOF") to determine the distance between the object and the LIDAR system. The science is based on the physics of light and optics. References made herein to a LIDAR system, or a light detection and ranging system, may also apply to other light detection systems.

In a LIDAR system, light may be emitted from a rapidly firing laser. Laser light travels through a medium and reflects off points of things in the environment like buildings, tree branches and vehicles. The reflected light energy returns to a LIDAR receiver (detector) where it is recorded and used to map the environment.

FIG. 1 depicts operation 100 of a light detection and ranging components 102 and data analysis & interpretation 109 according to embodiments of the present document. Light detection and ranging components 102 may comprise a transmitter 104 that transmits emitted light signal 110, receiver 106 comprising a detector, and system control and data acquisition 108. Emitted light signal 110 propagates through a medium and reflects off object 112. Return light signal 114 propagates through the medium and is received by receiver 106. System control and data acquisition 108 may control the light emission by transmitter 104 and the data acquisition may record the return light signal 114 detected by receiver 106. Data analysis & interpretation 109 may receive an output via connection 116 from system control and data acquisition 108 and perform data analysis functions. Connection 116 may be implemented with a wireless or non-contact communication method. Transmitter 104 and receiver 106 may include optical lens and mirrors (not shown). Transmitter 104 may emit a laser beam having a plurality of pulses in a particular sequence. In some embodiments, light detection and ranging components 102 and data analysis & interpretation 109 comprise a LIDAR system.

Figure 2:
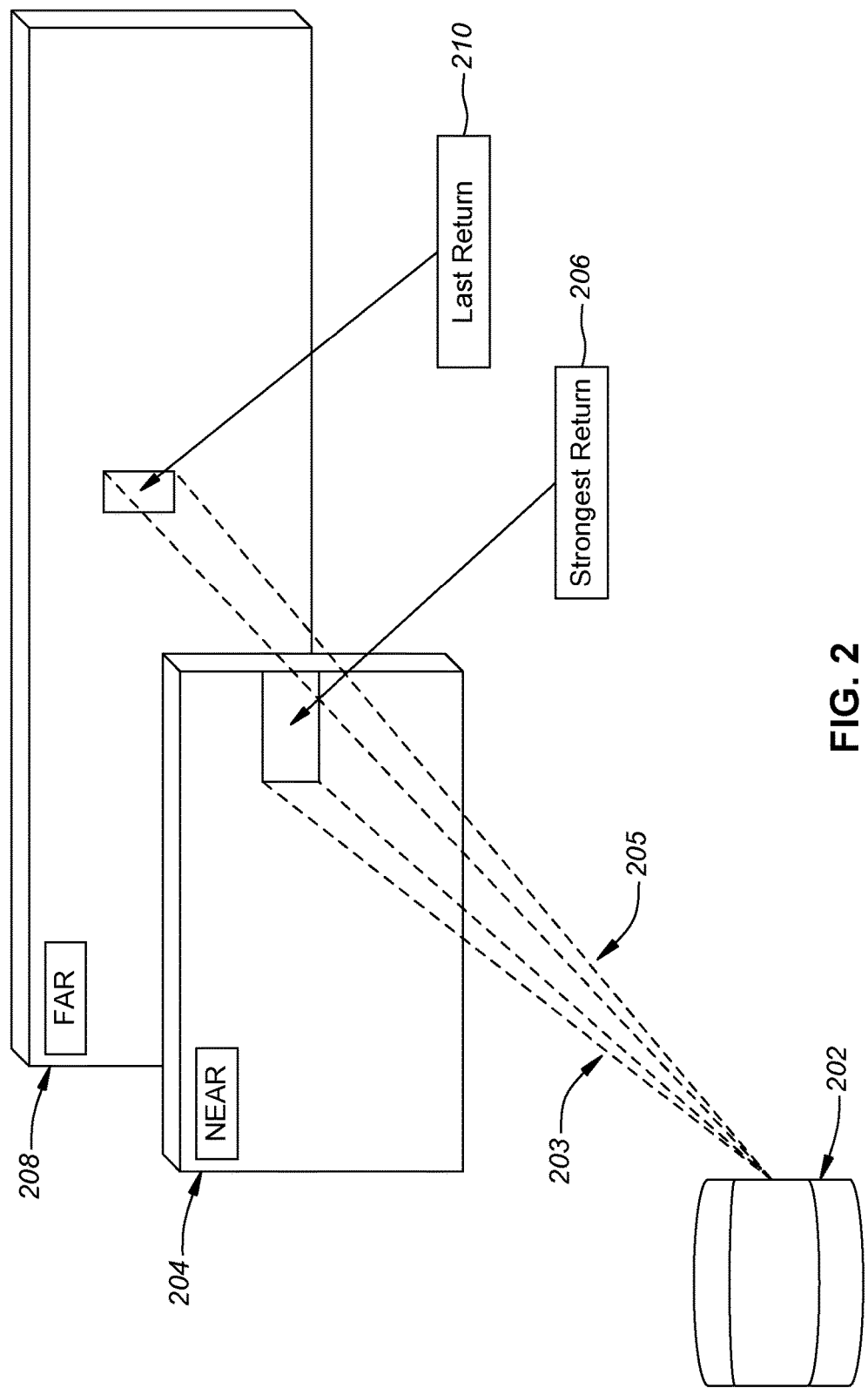
FIG. 2 illustrates the operation of a light detection and ranging system and multiple return light signals according to embodiments of the present document.

FIG. 2 illustrates the operation 200 of light detection and ranging system 202 including multiple return light signals: (1) return signal 203 and (2) return signal 205 according to embodiments of the present document. Light detection and ranging system 202 may be a LIDAR system. Due to the laser's beam divergence, a single laser firing often hits multiple objects producing multiple returns. The light detection and ranging system 202 may analyze multiple returns and may report either the strongest return, the last return, or both returns. Per FIG. 2, light detection and ranging system 202 emits a laser in the direction of near wall 204 and far wall 208. As illustrated, the majority of the beam hits the near wall 204 at area 206 resulting in return signal 203, and another portion of the beam hits the far wall 208 at area 210 resulting in return signal 205. Return signal 203 may have a shorter TOF and a stronger received signal strength compared with return signal 205. Light detection and ranging system 202 may record both returns only if the distance between the two objects is greater than minimum distance. In both single and multiple return LIDAR systems, it is important that the return signal is accurately associated with the transmitted light signal so that an accurate TOF is calculated.

Some embodiments of a LIDAR system may capture distance data in a 2-D (i.e. single plane) point cloud manner. These LIDAR systems may be often used in industrial applications and may be often repurposed for surveying, mapping, autonomous navigation, and other uses. Some embodiments of these devices rely on the use of a single laser emitter/detector pair combined with some type of moving mirror to effect scanning across at least one plane. This mirror not only reflects the emitted light from the diode, but may also reflect the return light to the detector. Use of a rotating mirror in this application may be a means to achieving 90-180-360 degrees of azimuth view while simplifying both the system design and manufacturability. The rotating mirror functionality may also be implemented with a solid state technology such as MEMS.

B. Constant Interference Detection

A constant interference detector may detect and distinguish false signal "hits" generated by constant interference, such as bright light saturation, from valid signals or pulses. Bright light saturation may be caused by sunlight. Two events that may cause false signal hits are 1) bursts of sunlight or bursts from other light sources, and 2) continuous exposure to sunlight or other light sources. The continuous exposure may be at a high level relative to the normal conditions for signal operation. In both cases, the constant interference detector determines if there is constant interference, e.g. sunlight, for a time period that is greater that the time period of the valid signal or pulse. In one embodiment, if a received signal exceeds a programmable threshold value for a programmable period of time, when compared to previously stored ambient light, a control signal is generated to inform the next higher network layer of a sudden change in ambient light. This control signal can be used to either discard the present return or process the signal in a different way. Digital logic can be employed to determine whether the received signal is valid or not. If the received signal is not valid, the received signal is discarded. The programmable threshold value may be adaptively adjusted based on changing environmental conditions. This functionality provides an "intelligent threshold" for the constant interference detector. In other embodiments, the constant interference detector may be operable to detect other types of electromagnetic signals.

1. Constant Interference Detector

Figure 3A:
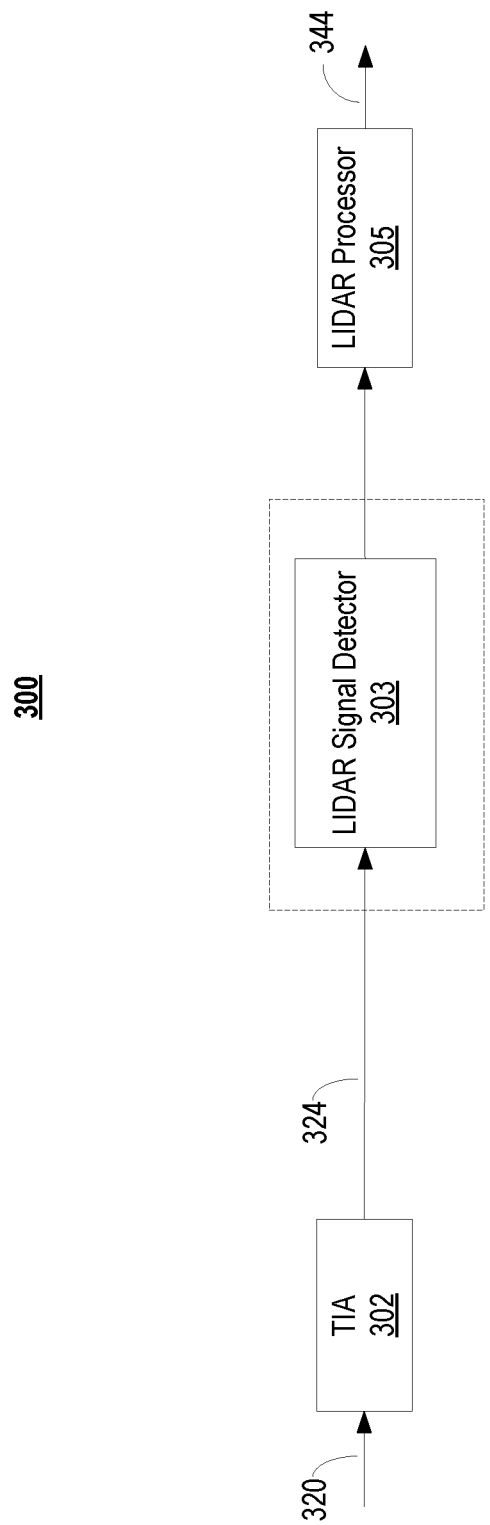
FIG. 3A depicts LIDAR signal detection according to embodiments of the present document.

FIG. 3A depicts LIDAR Signal Detection 300 according to embodiments of the present document. As illustrated, a Light Signal 320 may be received by Transimpedance Amplifier (TIA) 302, which in turn generates TIA Signal 324. TIA Signal 324 is an amplified voltage signal representing receive light signal of the LIDAR system. In some embodiments, TIA Signal 324 may be coupled to LIDAR Signal Detector 303. LIDAR Signal Detector 303 may detect LIDAR return pulses in a non-light blinding environment, but may be unable to detect LIDAR return pulses in a light blinding environment. The output of LIDAR Signal Detector 303 may be coupled to LIDAR Processor 305. The LIDAR Processor 305 controls one or more of the LIDAR signal detectors and other components associated with signal generation and detection. The LIDAR Processor 305 then collects all the data from the individual detectors to post-process the incoming data from all the detectors to form a group of 3-D distance data called point cloud. There may be an embodiment where the additional capabilities are added to the processor to perform advanced features like localized mapping, object detection, recognition etc. LIDAR Processor 305 generates output 344.

Figure 3B:
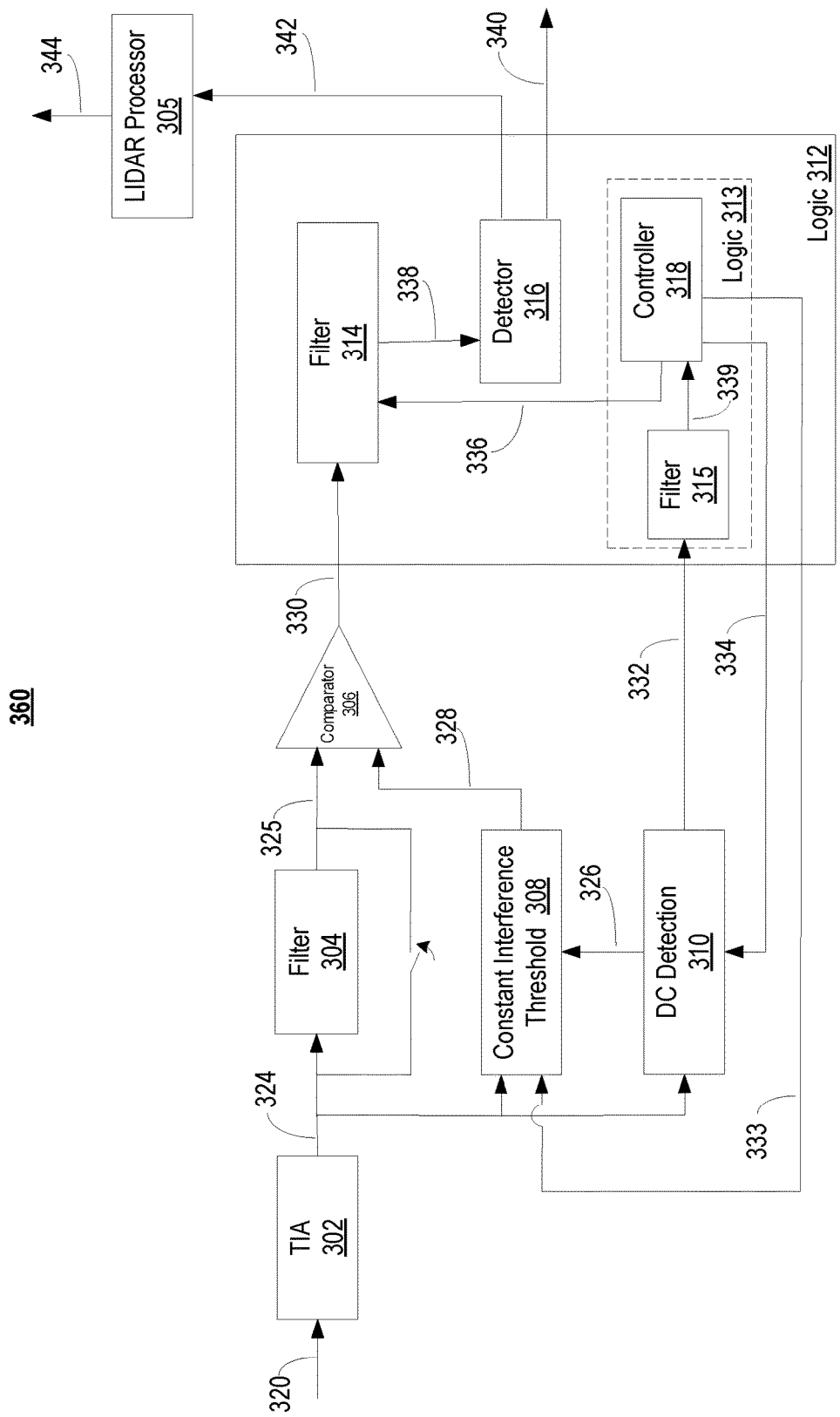
FIG. 3B depicts a constant interference detector according to embodiments of the present document.

FIG. 3B depicts a Constant Interference Detector 360 according to embodiments of the present document. In general, embodiments of Constant Interference Detector 360 may be applicable for electromagnetic signals. In the following discussion, the operation of Constant Interference Detector 360 is described relative to light signals in a LIDAR system.

As illustrated in FIG. 3B, Light Signal 320 from a LIDAR system may be coupled to TIA 302, which in turn generates TIA Signal 324. TIA Signal 324 is an amplified voltage signal representing receive light signal of the LIDAR system. Constant Interference Detector 360 comprises functional blocks of DC Detection 310, Constant Interference Threshold 308, Filter 304, Comparator 306, Logic 312, and LIDAR Processor 305. Logic 312 may comprise Controller 318, Detector 316, Filter 314, and Filter 315. Functions in Logic 312 may be implemented with digital logic. The combination of Controller 318 and Filter 315 is designated Logic 313.

DC Detection 310 may store an ambient DC value (ambient DC voltage) representing one or more previous values of TIA Signal 324. To perform this function, the one or more previous values of TIA Signal 324 and a Control Signal 334 from Controller 318 may be coupled to DC Detection 310. Control Signal 334 provides a control to determine a level of ambient light. An output of DC Detection 310, Previously Stored Voltage 326, represents a value for the previously stored voltage based on the ambient light, which is a calculated DC output. For example, Previously Stored Voltage 326 may be a DC value with a small offset compared to the DC value of the TIA Signal 324. In one embodiment, Previously Stored Voltage 326 may be 95% of the DC value of TIA Signal 324. Additional details for DC Detection 310 are disclosed in the discussion for FIG. 5.

Constant Interference Threshold 308 may determine the programmable percentage of DC detection, e.g., 40%, depending on season, time-of-day, etc. This determination may be based on the TIA Signal 324, Previously Stored Voltage 326 and Programmable Percentage Control 333. Programmable Percentage Control 333 may be generated by Controller 318. The output of Constant Interference Threshold 308 may be Threshold Voltage 328, which represents a ratio of a current measurement of the TIA Signal 324 and previously stored ambient light, i.e., Previously Stored Voltage 326. Threshold Voltage 328 may be utilized for determining if a Light Signal 320, in a current time period, comprises a constant interference environment via Comparator 306. Threshold Voltage 328 is a DC voltage. Constant Interference Threshold 308 is further discussed relative to FIG. 4.

Filter 304 may be an optional analog filter to detect real-time or filtered signal based on TIA Signal 324. In one embodiment, Filter 304 may be utilized at start-up, then by-passed thereafter. Accordingly, Signal 325 may be a filtered or unfiltered form of TIA Signal 324.

To determine if the light signal exceeds a programmable threshold value for a programmable period of time, TIA Signal 324 and Threshold Voltage 328 are coupled to Comparator 306, which generates Threshold Compare Signal 330 based on these signals. Threshold Compare Signal 330 indicates if the light signal exceeds the programmable threshold value. Threshold Voltage 328 is a DC voltage and Signal 325 is an AC voltage.

Logic 312 may determine if a Light Signal 320 in a current time period, as represented by TIA Signal 324, is not a valid signal and may be discarded. Logic 312 may comprise Filter 314 and Detector 316, and Logic 313. Logic 313 may comprise Filter 315 and Controller 318. Controller 318 may controls the length of time to sample (i.e., listen to) Light Signal 320. Controller 318 receives Digital Signal 332, coupled from DC Detection 310 via Filter 315, which is a digital output to compute the TIA DC common mode. Controller 318 may generate the following outputs:

Control Signal 334 that provides a control to determine a level of ambient light.

Programmable Percentage Control 333 that may determine the programmable percentage of DC detection implemented in Constant Interference Threshold 308.

Programmable Filter Control 336 that is coupled to Filter 314. The Programmable Filter Control 336 controls the length of time that may assist to determine a sudden increase in electromagnetic interference.

Filter 314 receives Programmable Filter Control 336 and Threshold Compare Signal 330. Filter 314 is a low pass filter and implements counter functions. In one embodiment, a sampling rate may be 8 ns (nano-seconds), operating with 64 counts of 8 ns. Therefore, the Constant Interference Detector 360 operates for a time period T of 512 ns before determining whether Light Signal 320 comprises a constant interference environment, i.e. a bright sunlight environment. Filter 314 may generate output 338 that is coupled to Detector 316.

Detector 316 may generate Detection Signal 342, which represent the decoded Light Signal 320, i.e., the decoded LIDAR return signal. Detection Signal 342 may be generated if Logic 312 has determined if Light Signal 320 should not be discarded. Detector 316 may also generate Calibration Signal 340 that controls periodic calibration and provides a memory (not shown) with the results of the constant interference detection. The memory may be a point cloud.

Figure 3C:
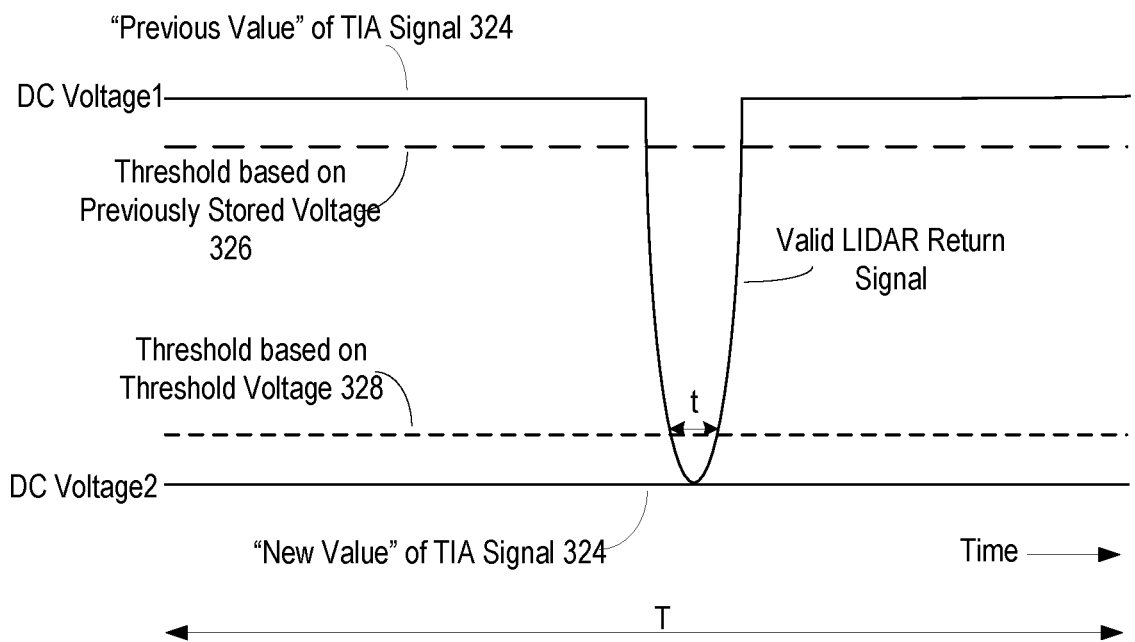
FIG. 3C illustrates LIDAR return signals received by a constant interference detector according to embodiments of the present document.

FIG. 3C illustrates LIDAR return signals 380 received by a receiver, such as Constant Interference Detector 360 according to embodiments of the present document. FIG. 3C illustrates voltage levels in the vertical axis and time in the horizontal axis. The voltage levels indicated are DC Voltage1 and DC Voltage2, where DC Voltage2 is a programmable value that is less than the value of DC Voltage1. For example, DC Voltage2 may be 60% the value of DC Voltage1. Also illustrated on FIG. 3C are a threshold voltage based on Previously Stored Voltage 326 and a threshold voltage based on Threshold Voltage 328, which were discussed relative to FIG. 3B. These threshold voltages may be constant during time period T. Time period T is the operating interval to determine whether Light Signal 320 comprises a constant interference environment.

The LIDAR return signals 380 are illustrated by "Previous Value" of TIA Signal 324 and "New Value" of TIA Signal 324. "Previous Value" of TIA Signal 324 occurred in a prior time period relative to "New Value" of TIA Signal 324. As illustrated, "Previous Value" of TIA Signal 324 represents a valid LIDAR return signal. The pulse of "Previous Value" of TIA Signal 324 may exceed the threshold based on Threshold Voltage 328, but only for a time period t. Time period t is relatively short compared the time period T, which is the operating interval to determine whether Light Signal 320 comprises a constant interference environment. Therefore, "Previous Value" of TIA Signal 324 may be determined to be a valid LIDAR return signal by Logic 312.

The "New Value" of TIA Signal 324 may be a signal that occurs immediately after "Previous Value" of TIA Signal 324. Therefore, "Previous Value" of TIA Signal 324 may be the basis for determining Threshold Voltage 328 by DC Detection 310 and Constant Interference Threshold 308. As illustrated in FIG. 3C, "New Value" of TIA Signal 324 comprises a constant voltage, DC Voltage2, that exceeds the threshold based on Previously Stored Voltage 326. Additionally, "New Value" of TIA Signal 324 exceeds the threshold based on Threshold Voltage 328. Since "New Value" of TIA Signal 324 exceeds the threshold based on Threshold Voltage 328 for time period T, the calculation by Controller 318 may determine that "New Value" of TIA Signal 324 may be discarded. Note that "exceeds the threshold" means that the voltage is reduced to a level below the threshold.

The threshold based on Threshold Voltage 328 may be adaptively adjusted based on the prior received LIDAR signals and other environmental conditions. Examples of environmental conditions may include, but without limitations, the season, weather, time-of-day. Accordingly, the subject thresholds may be considered "intelligent thresholds". Threshold Voltage 326 may be periodically adjusted.

2. Constant Interference Threshold Block

Figure 4:
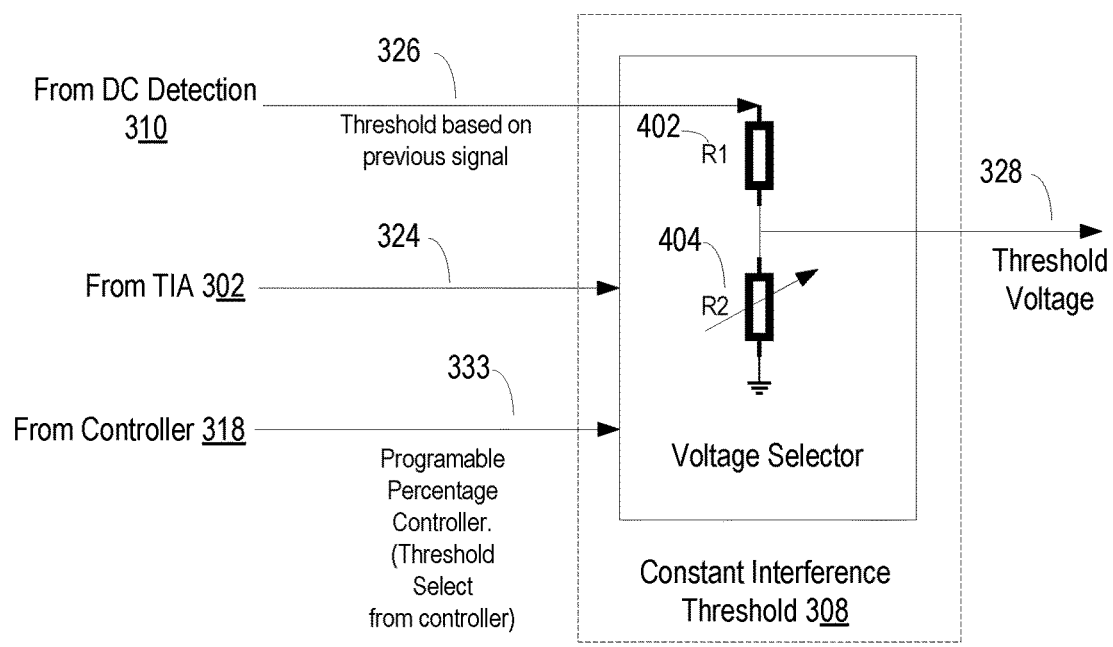
FIG. 4 depicts a constant interference threshold block according to embodiments of the current disclosure.

FIG. 4 depicts the functional block of Constant Interference Threshold 400 according to embodiments of the current disclosure. Constant Interference Threshold 400 discloses functional blocks of Constant Interference Threshold 308 of FIG. 3B. Constant Interference Threshold 400 comprises resistor R1 402 which is coupled to variable resistor R2 404. The Previously Stored Voltage 326 may be coupled to one end of resistor R1 402. Constant Interference Threshold 308 receives TIA Signal 324 and Programmable Percentage Control 333, which are utilized to determine a value for variable resistor R2 404. Thus, the ratio of resistor R1 402 and variable resistor R2 404 may detect a voltage that determines Threshold Voltage 328. Threshold Voltage 328 may be a sunlight threshold or blinding light threshold.

C. DC Detection Block

Figure 5:
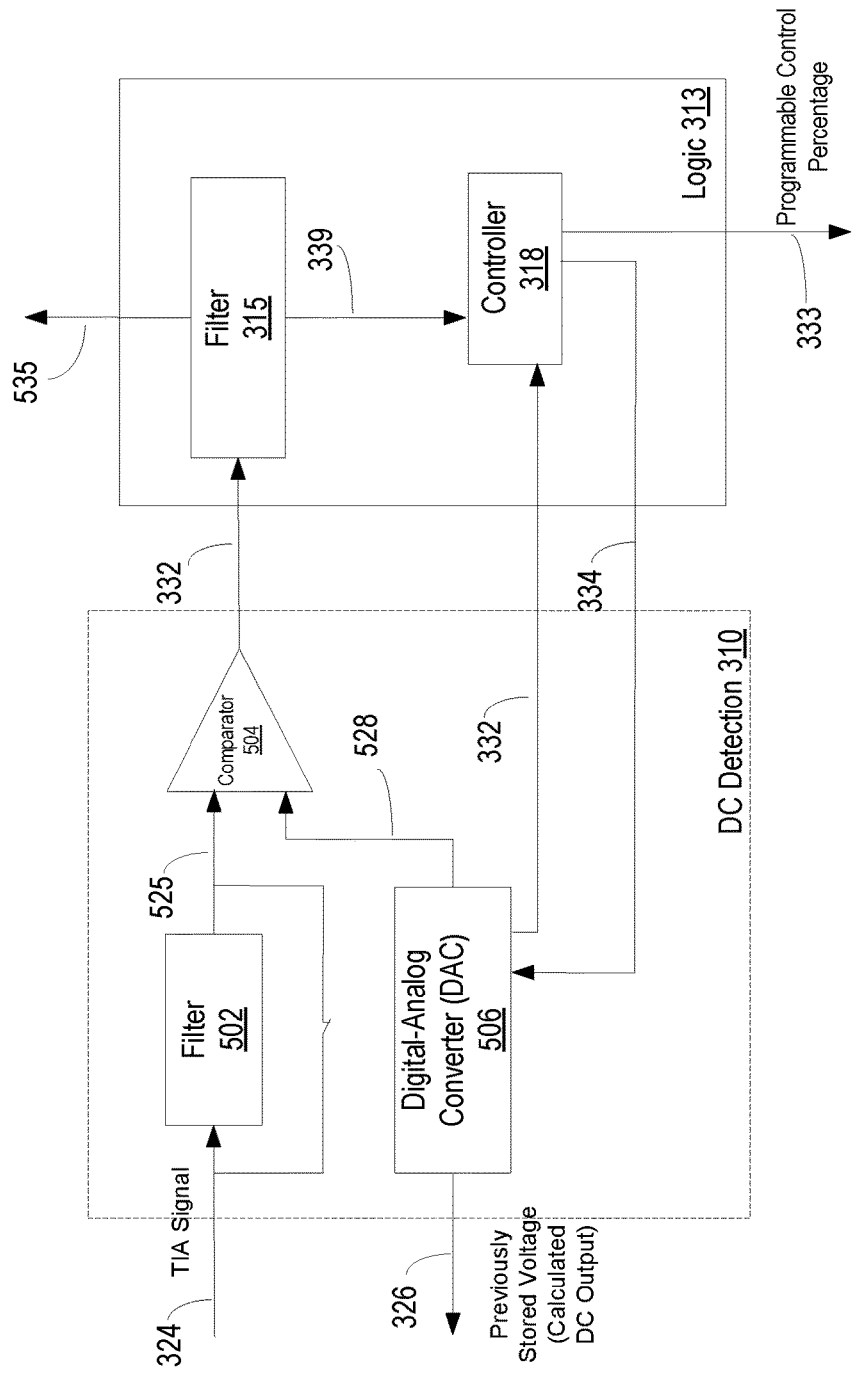
FIG. 5 depicts a DC detection block and associated logic according to embodiments of the present disclosure.

FIG. 5 depicts two functional blocks 500 comprising DC Detection 310 and associated logic 313 according to embodiments of the present disclosure. FIG. 5 discloses the elements of DC Detection 310 and Logic 313 of FIG. 3B. DC Detection 310 comprises Filter 502, Digital-Analog Converter (DAC) 506, and Comparator 504. DAC 506 may receive from Controller 318 digital signal Control Signal 334, which provides a control to determine a level of ambient light. In turn, DAC 506 may generate Digital Signal 332 and Previously Stored Voltage 326 (calculated DC output). DAC 506 may also generate Signal 528, which is used as a reference for finding an incoming signal. One variant of Signal 528 is Previously Stored Voltage 326, which is a calculated DC output.

Filter 502 may be an optional analog filter to detect real-time or filtered signal based on TIA Signal 324. In one embodiment, Filter 502 may be utilized at start-up, then by-passed thereafter. Accordingly, Signal 525 may be a filtered or unfiltered form of TIA Signal 324. Comparator 504 may receive Signal 525 and Signal 528 to generate Digital Signal 332. Digital Signal 332 is subsequently filtered by Filter 315 to generate Control Signal 339. Control Signal 339 may be coupled to Controller 318. Filter 315 also generates output 535.

D. Detection Method

Figure 6A:
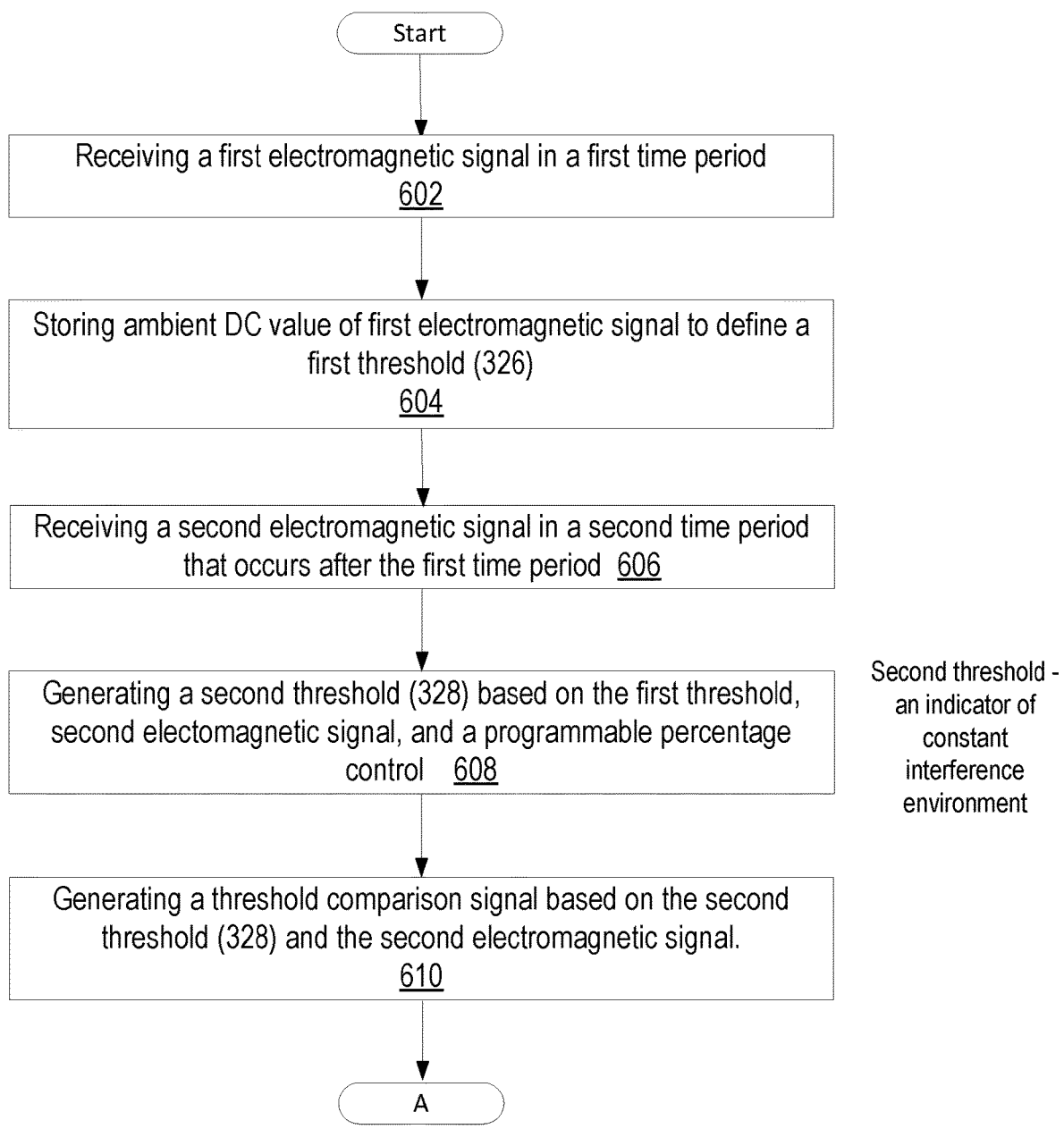
FIGS. 6A and 6B graphically illustrates flow charts that describe a method for detecting constant interference in an electromagnetic signal according to embodiments of the present disclosure.
Figure 6B:
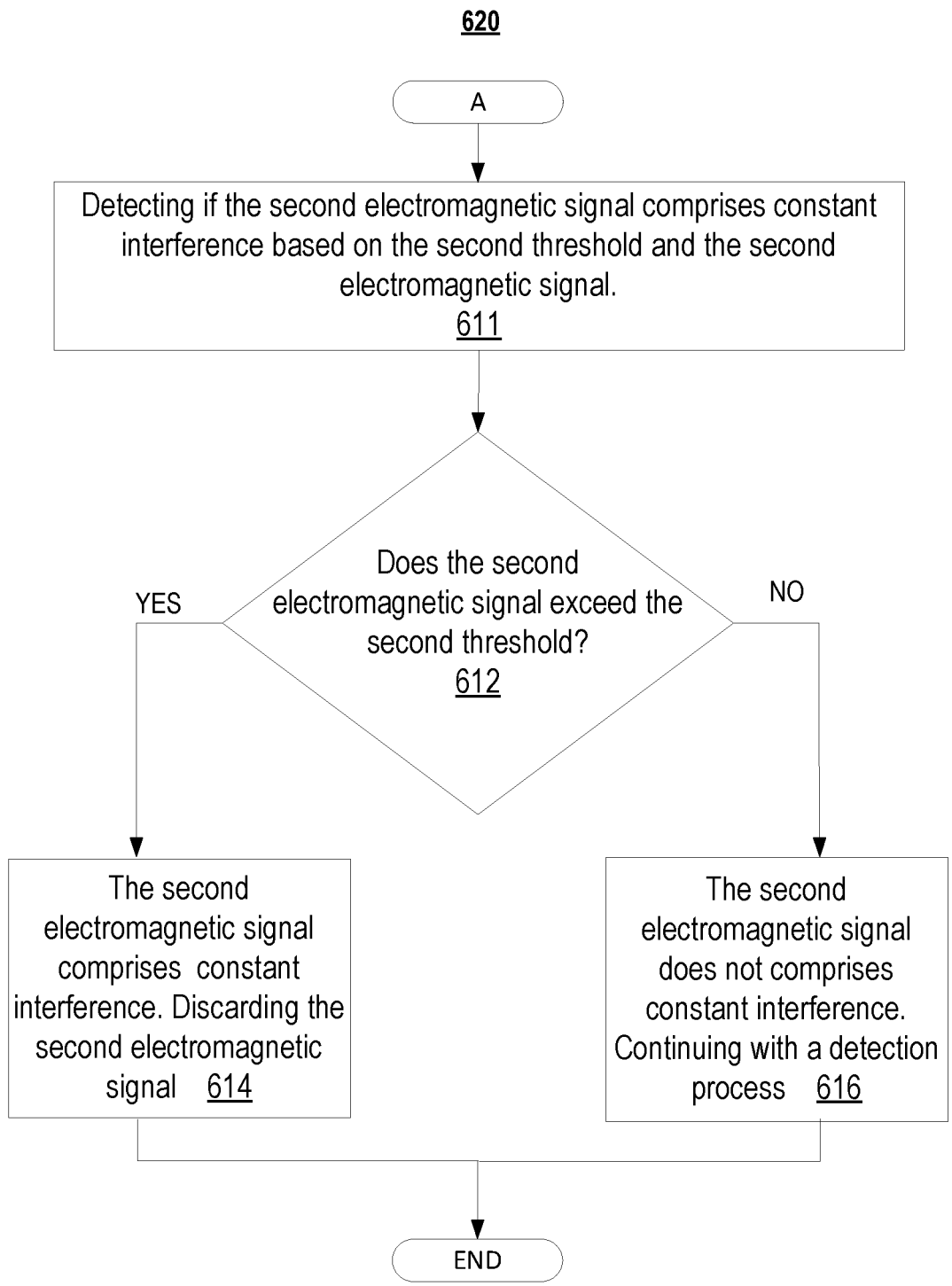

FIGS. 6A and 6B graphically illustrates flow charts 600 and 620 that describe a method for detecting constant interference in an electromagnetic signal according to embodiments of the present disclosure. The method comprises the following steps:

receiving a first electromagnetic signal in a first time period; (step 602)

storing an ambient DC value of first electromagnetic signal to define a first threshold; (step 604)

receiving a second electromagnetic signal in a second time period that occurs after the first time period; (step 606)

generating a second threshold based on the first threshold, second electromagnetic signal, and a programmable percentage control; (step 608)

generating a threshold comparison signal based on the second threshold and the second electromagnetic signal; (step 610)

detecting if the second electromagnetic signal comprises constant interference based on the second threshold and the second electromagnetic signal; (step 611)

if the second electromagnetic signal exceeds the second threshold, the second electromagnetic signal comprises constant interference, and then the second electromagnetic signal is discarded; (steps 612, 614)

if the second electromagnetic signal does not exceed the second threshold, the second electromagnetic signal does not comprise constant interference, and then the second electromagnetic signal proceeds with a detection process. (steps 612, 616)

E. System Embodiments

In embodiments, aspects of the present patent document may be directed to or implemented on signal detection systems/computing systems. For purposes of this disclosure, a computing system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data for business, scientific, control, or other purposes. For example, a computing system may be a personal computer (e.g., laptop), tablet computer, phablet, personal digital assistant (PDA), smart phone, smart watch, smart package, server (e.g., blade server or rack server), a network storage device, or any other suitable device and may vary in size, shape, performance, functionality, and price. The computing system may include random access memory (RAM), one or more processing resources such as a central processing unit (CPU) or hardware or software control logic, ROM, and/or other types of memory. Additional components of the computing system may include one or more disk drives, one or more network ports for communicating with external devices as well as various input and output (I/O) devices, such as a keyboard, a mouse, touchscreen and/or a video display. The computing system may also include one or more buses operable to transmit communications between the various hardware components.

Figure 7:
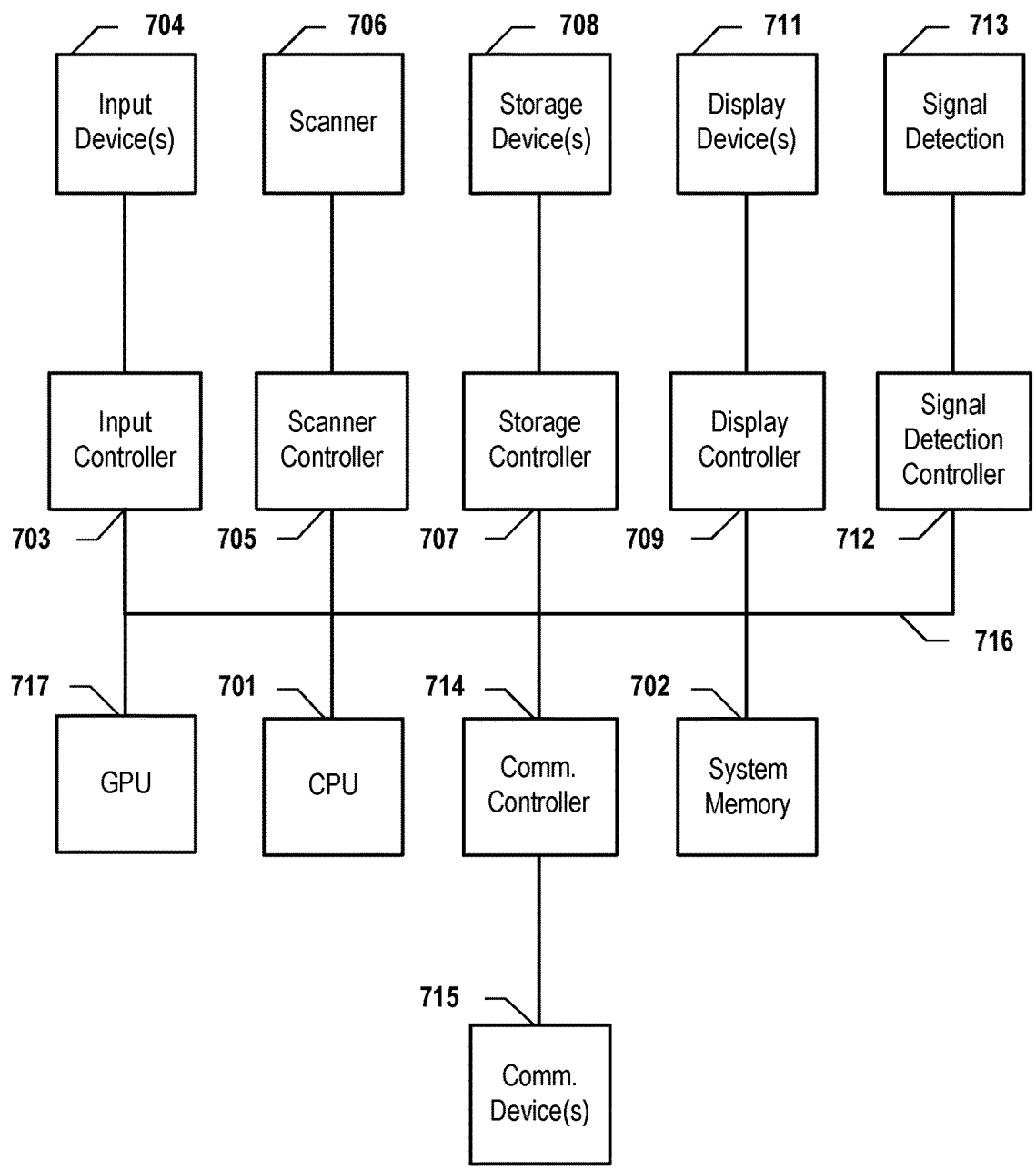
FIG. 7 depicts a simplified block diagram of a computing device/constant interference detection system, in accordance with embodiments of the present document.

FIG. 7 depicts a simplified block diagram of a computing device/signal detection system (or computing system) according to embodiments of the present disclosure. It will be understood that the functionalities shown for system 700 may operate to support various embodiments of a signal detection system—although it shall be understood that a signal detection system may be differently configured and include different components.

As illustrated in FIG. 7, system 700 includes one or more central processing units (CPU) 701 that provides computing resources and controls the computer. CPU 701 may be implemented with a microprocessor or the like, and may also include one or more graphics processing units (GPU) 717 and/or a floating point coprocessor for mathematical computations. System 700 may also include a system memory 702, which may be in the form of random-access memory (RAM), read-only memory (ROM), or both.

A number of controllers and peripheral devices may also be provided, as shown in FIG. 7. An input controller 703 represents an interface to various input device(s) 704, such as a keyboard, mouse, or stylus. There may also be a scanner controller 705, which communicates with a scanner 706. System 700 may also include a storage controller 707 for interfacing with one or more storage devices 708 each of which includes a storage medium such as magnetic tape or disk, or an optical medium that might be used to record programs of instructions for operating systems, utilities, and applications, which may include embodiments of programs that implement various aspects of the present invention. Storage device(s) 708 may also be used to store processed data or data to be processed in accordance with the invention. System 700 may also include a display controller 709 for providing an interface to a display device 711, which may be a cathode ray tube (CRT), a thin film transistor (TFT) display, or other type of display. The computing system 700 may also include a Signal Detection Controller 712 for communicating with a Signal Detection 713. A communications controller 714 may interface with one or more communication devices 715, which enables system 700 to connect to remote devices through any of a variety of networks including the Internet, a cloud resource (e.g., an Ethernet cloud, an Fiber Channel over Ethernet (FCoE)/Data Center Bridging (DCB) cloud, etc.), a local area network (LAN), a wide area network (WAN), a storage area network (SAN) or through any suitable electromagnetic carrier signals including infrared signals.

In the illustrated system, all major system components may connect to a bus 716, which may represent more than one physical bus. However, various system components may or may not be in physical proximity to one another. For example, input data and/or output data may be remotely transmitted from one physical location to another. In addition, programs that implement various aspects of this invention may be accessed from a remote location (e.g., a server) over a network. Such data and/or programs may be conveyed through any of a variety of machine-readable medium including, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices.

Embodiments of the present invention may be encoded upon one or more non-transitory computer-readable media with instructions for one or more processors or processing units to cause steps to be performed. It shall be noted that the one or more non-transitory computer-readable media shall include volatile and non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present invention may further relate to computer products with a non-transitory, tangible computer-readable medium that have computer code thereon for performing various computer-implemented operations. The media and computer code may be those specially designed and constructed for the purposes of the present invention, or they may be of the kind known or available to those having skill in the relevant arts. Examples of tangible computer-readable media include, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices. Examples of computer code include machine code, such as produced by a compiler, and files containing higher level code that are executed by a computer using an interpreter. Embodiments of the present invention may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present invention. One skilled in the art will also recognize that a number of the elements described above may be physically and/or functionally separated into sub-modules or combined together.

In summary, a method of detecting a constant interference environment by an electromagnetic receiver may comprise receiving an electromagnetic signal; determining if the electromagnetic signal exceeds a programmable threshold value for a programmable period of time, wherein the programmable threshold value is based on a previously received electromagnetic signal. If the electromagnetic signal exceeds the programmable threshold value for the programmable period of time, discarding the electromagnetic signal. Exceeding the programmable threshold for the programmable period of time indicates the electromagnetic signal comprises a constant interference environment. If the electromagnetic signal does not exceed a programmable threshold value for the programmable period of time, proceed with a detection process. Also, if the electromagnetic signal does exceed a programmable threshold value for the programmable period of time, generating a control signal to inform the next higher OSI network layer of a processor of Controller 318 of a sudden change in the electromagnetic signal.

The programmable threshold value may be adaptively adjusted based on changing environmental conditions. In some embodiments, the environmental conditions include season, weather, and/or time-of-day.

In some embodiments, the electrometric signal is a light signal, and the light signal is detected by a LIDAR system. The light signal may exceed the programmable threshold due to bursts of sunlight or other light sources. The light signal may exceed the programmable threshold due to continuous exposure to sunlight or other light sources.

A system for detecting a constant interference environment in an electromagnetic signal may comprise:
1) a DC detection block that may store an ambient DC value representing one or more previous input values of input signals and store a voltage based on the previous input values, wherein the stored voltage defines a first threshold (Previously Stored Voltage 326);
2) a constant interference threshold block that may generate a threshold voltage for determining constant interference, wherein the threshold voltage defines a second threshold (Threshold Voltage 328) that may be based on the ambient DC value of the previous input signals i.e., first threshold (Previously Stored Voltage 326), a current input value of a current input signal, and a programmable percentage control;
3) a comparator that generates a threshold compare signal based on the second threshold (Threshold Voltage 328) and the current input signal, and
4) a logic block that may determine if the electromagnetic signal in a current time period comprises constant interference. Generally, the electromagnetic signal may be discarded if the received electromagnetic signal includes constant interference. If the electromagnetic signal does not comprise constant interference, the electromagnetic signal in the current time period may continue a detection process.

The logic block comprises a controller that controls the length of time to sample an input signal. The controller generates:
Control Signal 334 that provides a control to determine a level of ambient light.
Programmable Percentage Control 333 that may determine a programmable percentage of DC detection implemented in the constant interference threshold block.
Programmable Filter Control 336 that is coupled to Filter 314.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

What is claimed is:

1. A method comprising:
    receiving, at a LIDAR signal detector, a first electromagnetic signal;
    determining, by the LIDAR signal detector, whether the first electromagnetic signal exceeds a programmable threshold value for at least a programmable period of time, wherein the programmable threshold value is based at least on a second, previously received electromagnetic signal; and
    based on a determination that the first electromagnetic signal exceeds the programmable threshold value for at least the programmable period of time, generating a first control signal to prevent a LIDAR processor from generating distance data based on the first electromagnetic signal and generating a second control signal to indicate a change in ambient light,
    wherein exceeding the programmable threshold for at least the programmable period of time indicates the first electromagnetic signal is generated by constant interference.

2. The method of claim 1, further comprising:
    receiving, at the LIDAR signal detector, a third electromagnetic signal;
    determining, by the LIDAR signal detector, whether the third electromagnetic signal exceeds the programmable threshold value for at least the programmable period of time; and
    based on a determination that the third electromagnetic signal does not exceed the programmable threshold value for at least the programmable period of time, generating, by the LIDAR processor, distance data based on the third electromagnetic signal.

3. The method of claim 1, further comprising adaptively adjusting the programmable threshold value based on changing environmental conditions.

4. The method of claim 3, wherein the environmental conditions include season, weather, and/or time-of-day.

5. The method of claim 1, wherein the first electromagnetic signal is derived from a light signal.

6. The method of claim 5, wherein the first electromagnetic signal exceeds the programmable threshold value for at least the programmable period of time due to bursts of sunlight or other light sources, or continuous exposure to sunlight or other light sources.

7. A system comprising:
    a DC detection circuit operable to store a first voltage corresponding to a level of ambient light, wherein the first voltage defines a first threshold;
    a constant interference threshold circuit operable to determine a second threshold based on the first threshold;
    a comparator operable to generate a threshold compare signal based on the second threshold and a first electromagnetic signal; and
    a logic circuit operable to control the DC detection circuit to determine the level of ambient light, and further to determine based on the threshold compare signal whether the first electromagnetic signal exceeds the second threshold for at least a programmable period of time, wherein exceeding the second threshold for at least the programmable period of time indicates the first electromagnetic signal is generated by constant interference.

8. The system of claim 7, wherein, based on determining that the first electromagnetic signal is generated by the constant interference, the logic circuit is further operable to generate a control signal to prevent a LIDAR processor from generating distance data based on the first electromagnetic signal.

9. The system of claim 7, wherein based on determining that the first electromagnetic signal is not generated by the constant interference, the logic circuit is further operable to signal a LIDAR processor to generate distance data based on the first electromagnetic signal.

10. The system of claim 7, wherein the logic circuit is further operable to control a length of time to sample electromagnetic signals.

11. The system of claim 7, wherein the logic circuit is further operable to adjust the second threshold based on environmental conditions.

12. The system of claim 7, wherein the first electromagnetic signal is derived from a light signal.

13. The system of claim 12, wherein the first electromagnetic signal exceeds the second threshold for at least the programmable period of time due to bursts of sunlight or other light sources, or continuous exposure to sunlight or other light sources.

14. A non-transitory computer readable storage medium having computer program code stored thereon, the computer program code, when executed by one or more processors of a LiDAR system, causes the LIDAR system to perform operations comprising:
  receiving, at a LIDAR signal detector, a first electromagnetic signal;
  determining, by the LIDAR signal detector, whether the first electromagnetic signal exceeds a programmable threshold value for at least a programmable period of time, wherein the programmable threshold value is based on a second, previously received electromagnetic signal; and
  based on a determination that the first electromagnetic signal exceeds the programmable threshold value for at least the programmable period of time, generating a first control signal to prevent a LIDAR processor from generating distance data based on the first electromagnetic signal and generating a second control signal to indicate a change in ambient light,
  wherein exceeding the programmable threshold for at least the programmable period of time indicates the first electromagnetic signal is generated by constant interference.

15. The non-transitory computer readable storage medium of claim 14, wherein the operations further comprise:
  receiving, at the LIDAR signal detector, a third electromagnetic signal;
  determining, by the LIDAR signal detector, whether the third electromagnetic signal exceeds the programmable threshold value for at least the programmable period of time; and
  based on a determination that the third electromagnetic signal does not exceed the programmable threshold value for at least the programmable period of time, generating, by the LIDAR processor, distance data based on the third electromagnetic signal.

16. The non-transitory computer readable storage medium of claim 14, wherein the first electromagnetic is derived from a light signal.

* * * * *